UNITED STATES PATENT OFFICE.

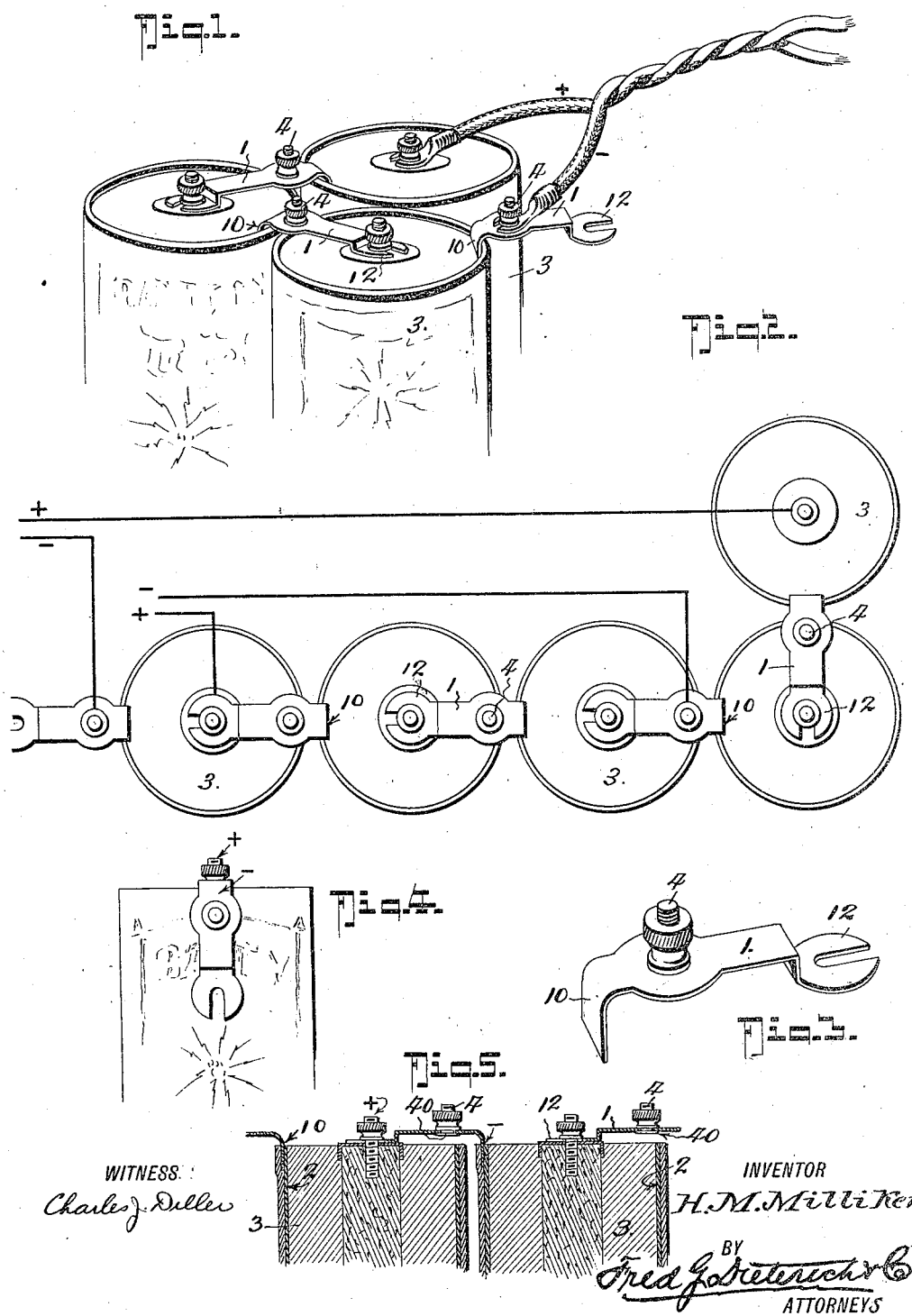

HARRY M. MILLIKEN, OF CHEBOYGAN, MICHIGAN.

BATTERY CONNECTION.

1,201,215.  Specification of Letters Patent.  Patented Oct. 10, 1916.

Application filed July 29, 1916. Serial No. 112,076.

*To all whom it may concern:*

Be it known that I, HARRY M. MILLIKEN, residing at Cheboygan, in the county of Cheboygan and State of Michigan, have invented a new and Improved Battery Connection, of which the following is a specification.

This invention has reference to that class of devices especially designed for connecting the dry batteries and it primarily has for its object to provide a simple and inexpensive clip device for making the battery connections, that can make any connection that is usually made with any dry battery with wire or other connectors.

Another object of my invention is to provide an improved device of the general character stated that can readily get the batteries in series connection or in multiple connection or used on one battery, as desired.

Again, my invention seeks to provide a peculiar construction of clip connection designed for getting any angle on batteries that can be had with wire or other connectors, that can be installed handier, easier and quicker than is possible with the conventional type of connecting devices and that provides for getting better contacts than is possible in the use of wire connectors.

With other objects in view that will hereinafter appear, my invention consists in the peculiar construction and novel arrangement of the parts hereinafter to be explained, specifically pointed out in the appended claims and illustrated in the accompanying drawing, in which:

Figure 1 is a perspective view of a number of dry batteries coupled up with my improved connecting device. Fig. 2 is a top plan view of a set of five batteries coupled up with my improved connectors in multiple series. Fig. 3 is a perspective view of one of my improved battery connectors. Fig. 4 is a side view of a portion of a dry battery with one of my connectors attached, the same being shown bent down to provide for compactly packing the battery when shipping or storing the same, and Fig. 5 is a section of a portion of two batteries with one of my connectors operatively joined therewith.

My improved connecting device, the construction of which is best shown in Fig. 3 of the drawings, consists of a thin flexible metal member that includes a body 1, one end of which is downwardly bendable to provide a heel portion 10, adapted to be readily soldered to the zinc electrode 2 of a battery 3.

Midway its length, the clip body 1 is preferably enlarged, and at such enlarged point, it is provided with a set screw connector 4, the post or terminal 40 of which is soldered, riveted or otherwise made fast to the said body or plate 1.

The free end of the clip 1 is bent down at right angles and terminates in a flat forked head 12, which, when the connector is operatively applied, engages the screw connector or carbon terminal of an adjacent battery, as shown.

By reason of the peculiar construction of my battery connector device, the said device can be readily bent down over the side of the battery, see Fig. 4, when packing for shipping, the flexibility of the material of which the connector is made preventing breaking when bending it to suit the required conditions. Again, by making the connector of a thin flexible metal, as shown, connection can be conveniently made with batteries of different heights.

From the foregoing description taken in connection with the accompanying drawing, the complete construction, the manner of its use and the advantages of my invention will be readily apparent.

By making the connector of a thin flexible plate and providing the same with a screw connection or terminal 4, as stated and shown, the ready connection of batteries in multiple series is provided for with better contacts than is possible when using the ordinary wire battery connections.

What I claim is:

1. A connector for batteries that consists of a flexible metal plate having one end bendable and adapted for connection with the zinc electrode of a battery, and a flat forked head adapted for connection with the carbon electrode of another battery, and a screw connection or terminal carried on the body of the said plate.

2. The combination with a dry battery; of a connector device that consists of a thin flexible metal plate including a bendable end permanently attached to the zinc electrode of the battery, said plate being bendable down over the side of the battery and terminating in a forked head adapted for connection with the carbon electrode of an adjacent battery, and a screw connection attached to the plate.

3. A battery connection consisting of a plate having one end adapted for being permanently secured to the zinc plate of one battery and the other end forked for engaging the carbon electrode of another battery and having a terminal connector intermediate its end.

4. A battery connection comprising a bendable metal strip having one end bent over to form a connection which is adapted to be permanently secured to an electrode of a battery cell, the other end of said strip being provided with an offset forked member to engage the terminal screw of another battery cell, and a terminal connector carried by said strip between the ends of the same, substantially as shown and for the purposes described.

HARRY M. MILLIKEN.